Nov. 21, 1967    G. P. GRIEVE    3,353,805
OVEN CHAMBER
Filed Aug. 18, 1965    3 Sheets-Sheet 1
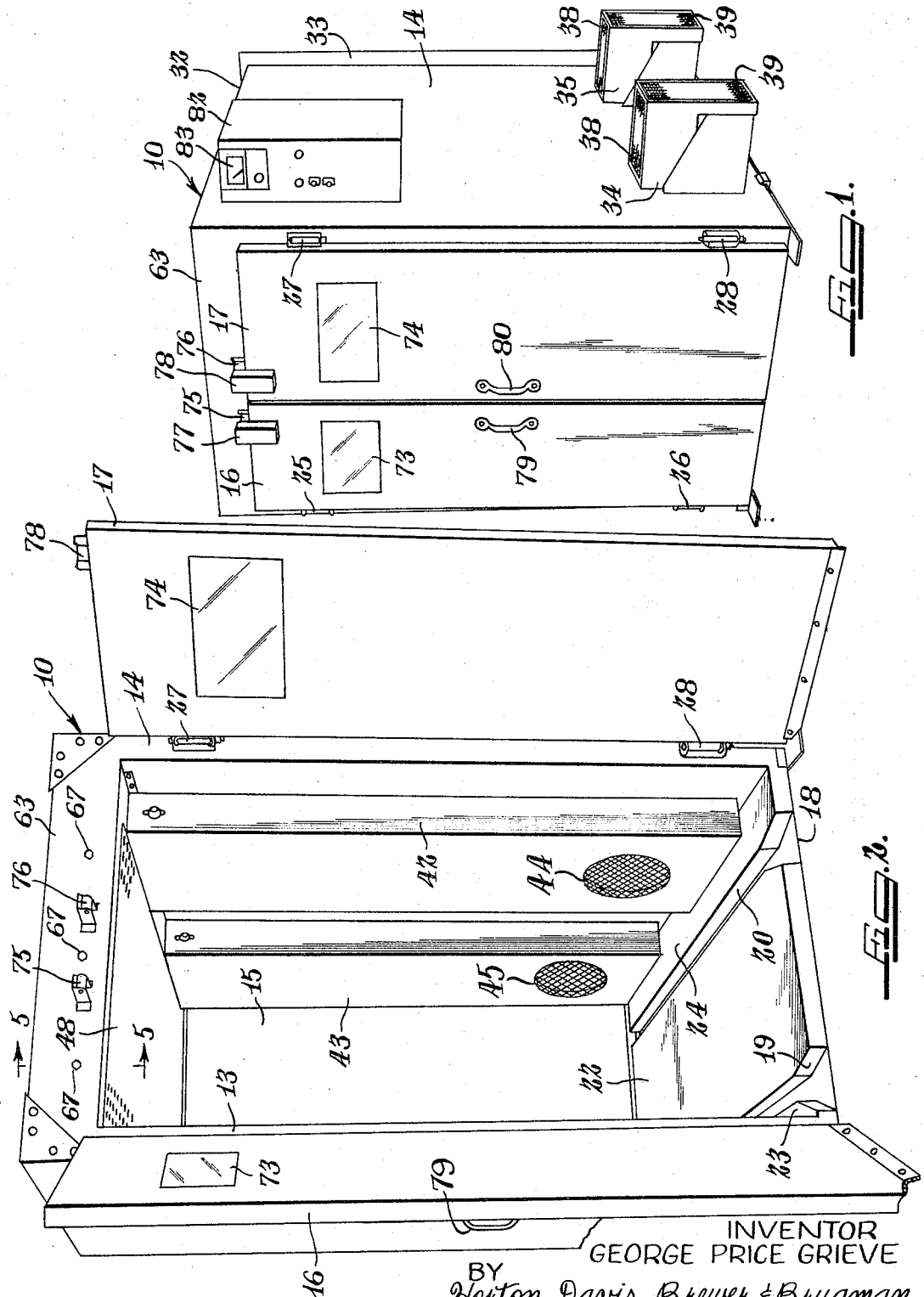
INVENTOR
GEORGE PRICE GRIEVE
BY Horton, Davis, Brewer & Brugman
Attys.

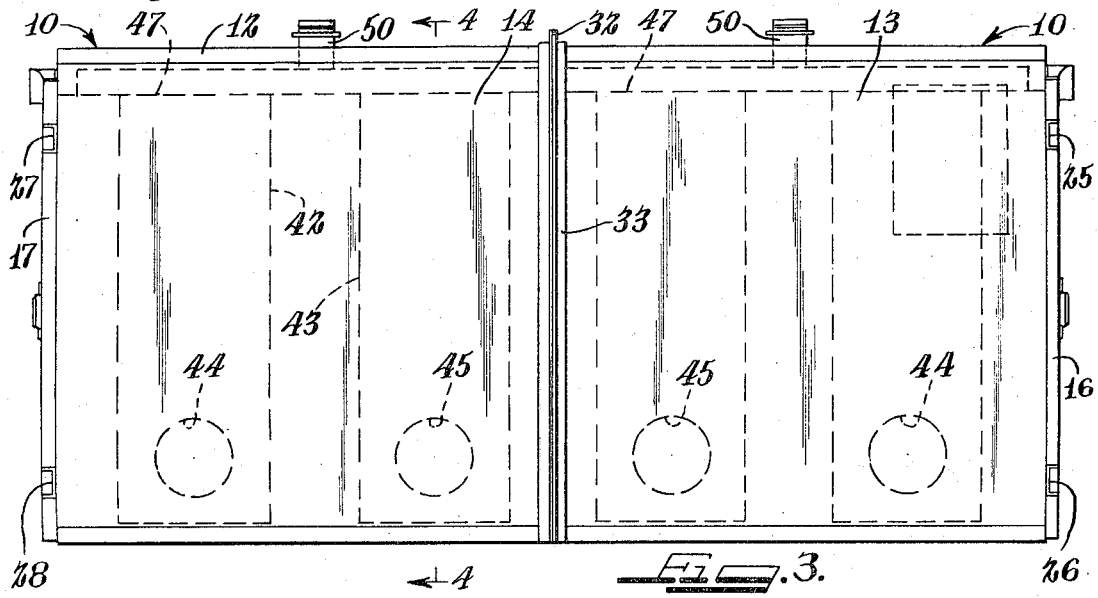
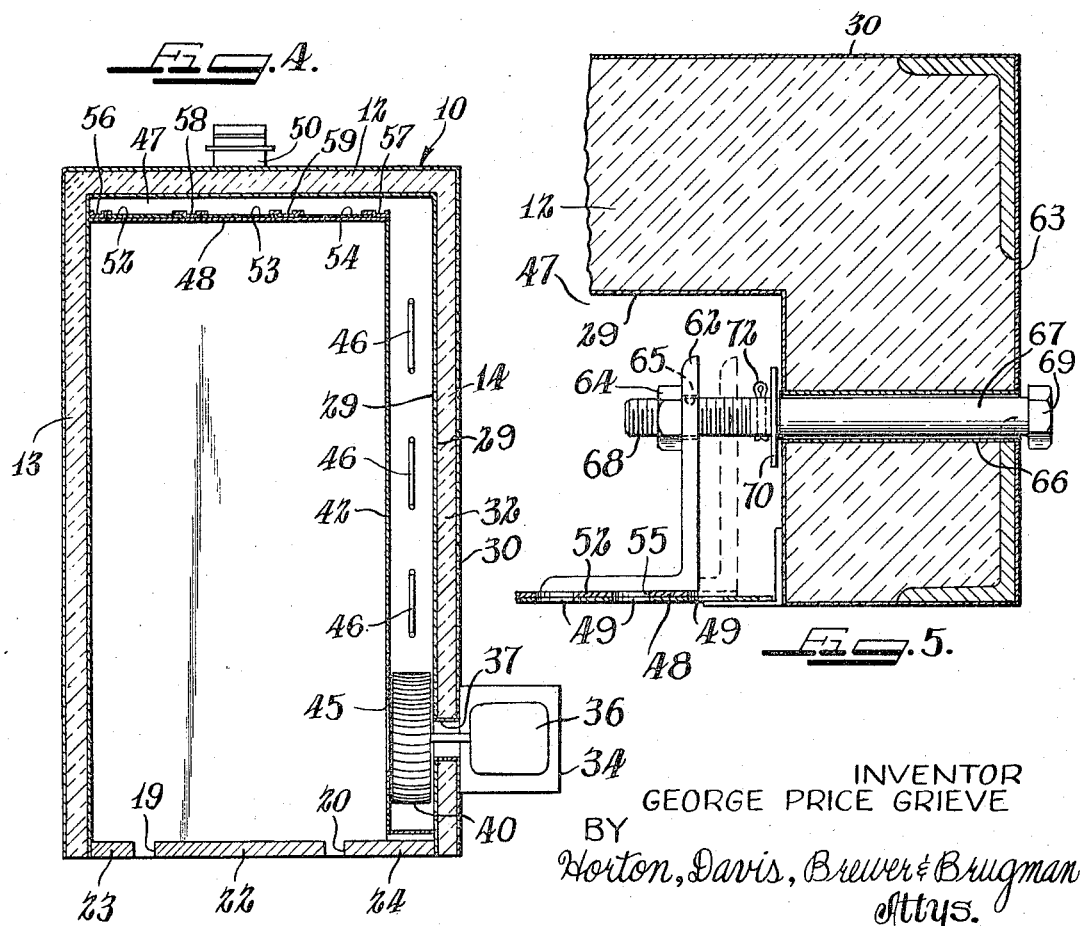

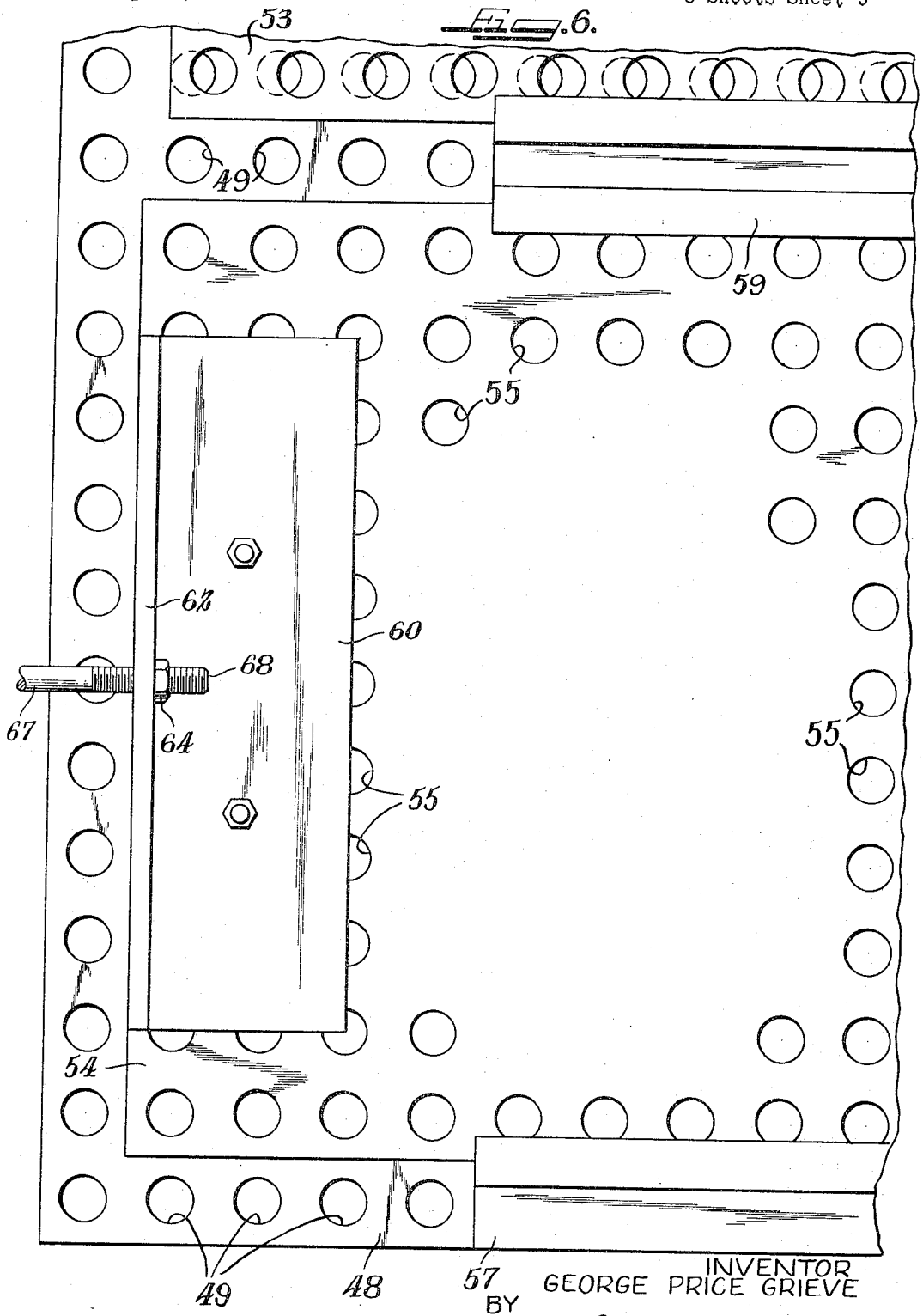

United States Patent Office 3,353,805
Patented Nov. 21, 1967

3,353,805
OVEN CHAMBER
George Price Grieve, Glenview, Ill.
(1350 N. Elston Ave., Chicago, Ill. 60622)
Filed Aug. 18, 1965, Ser. No. 480,594
5 Claims. (Cl. 263—40)

ABSTRACT OF THE DISCLOSURE

This oven has heat insulating outer walls with a foraminous inner wall spaced from one of the outer walls to define a header space to which a heated mixture of fresh and recirculated air is supplied at a rate and pressure sufficient to maintain the pressure in the header space above normal atmospheric pressure, there being an exhaust port in communication with the header space which has less air flow capacity than the foraminous plate and through which a portion of the circulated air is exhausted to the exterior of the oven, while the foraminous plate effects a relatively uniform and non-turbulent distribution of the flow of air within the oven.

---

This invention relates to ovens, and more particularly to ovens in which a controlled and relatively large volume of heated air is circulated in a prescribed path with as little turbulence as possible within the work space of the oven.

One of the objects of my invention is to provide an oven in which heated air is distributed and circulated under pressure through a multiplicity of orifices spread over one wall of the oven to effect relatively uniform distribution of the air flow in one direction through the space within the oven.

Another object of the invention is to provide evenly and continuously adjustable means for controlling the flow of heated air through an oven while maintaining relative uniformity of distribution of the moving air over a large portion of the area of one interior wall of the oven structure.

This invention further has within its purview the provision of an oven in which heated air is fed into the interior space through a foraminous inner wall from a header space in which the heated air is maintained under pressure.

As another object, this invention comprehends the provision of an oven made in sections which can be secured together for enlarging the load capacity of the oven.

My invention also has within its purview the provision of an oven in which heated air is forced downwardly through the space within the oven from a foraminous top wall and is exhausted at the lower portion of the oven interior.

Another object of the invention is to provide an oven having forced internal air circulation with provision for adding some air to that being circulated and provision for exhausting some air to the exterior.

Further objects, advantages and purposes of this invention will become apparent from the following description and drawings of which:

FIG. 1 is a perspective view of the exterior of an oven embodying a preferred form of this invention; the oven being shown with the doors closed;

FIG. 2 is another perspective view of the oven shown in FIG. 1 and wherein the doors are open to show details of the interior structure of the oven;

FIG. 3 is a side elevational view of a modification of the invention wherein two ovens of the type shown in FIGS. 1 and 2 have their back walls removed and are secured together to form a single oven having substantially twice the capacity of an oven such as that shown in FIGS. 1 and 2;

FIG. 4 is an end sectional view of one of the ovens and wherein the section is taken substantially as indicated by a line 4—4 and accompanying arrows in FIG. 3;

FIG. 5 is a fragmentary side sectional view, drawn to a larger scale than that used in the other figures, and taken substantially as indicated by a line 5—5 and accompanying arrows in FIG. 2; and FIG. 6 is a top plan view of an internal part of the oven structure which is drawn to a large scale to depict details of the structure.

In the exemplary embodiment of this invention which is disclosed in the accompanying drawings for illustrative purposes, an oven 10 constitutes a generally rectangular and box-like structure having a heat insulating top wall 12, heat insulating side walls 13 and 14, a heat insulating back wall 15 and heat insulating doors 16 and 17 which, together, provide a closure for the end of the oven opposite the back wall 15. The base of the oven in the disclosed structure is made up of a base plate which extends between the bottoms of the side walls 13 and 14 and has secured thereto channels 19 and 20 which are spaced laterally from one another and extend along the oven base plate in generally parallel relationship from the end of the oven having the doors 16 and 17 mounted thereon. These channels provide tracks on which trucks carrying material to be heat treated can be readily rolled into the oven when the doors are open. Heat insulating concrete material fills the space 22 between the channels 19 and 20 and the spaces 23 and 24 between those channels and the oven side walls 13 and 14 to a level flush with the tops of the channels. Hinges 25, 26, 27 and 28 support the doors 16 and 17 relative to the side walls 13 and 14 for swinging movements between the closed positions, as shown in FIG. 1, and open positions, as shown in FIG. 2.

As shown in FIG. 4, the heat insulated side and top walls of the disclosed oven are constituted of inner and outer sheet metal shells 29 and 30 respectively which have a substantial thickness of heat insulating material 32 therebetween. As disclosed herein, the back wall 15 is separately fabricated as a unit, and while it, like the side and top walls, embodies an outer sheet metal shell having a substantial quantity and thickness of insulating material within the metal shell, the margins thereof are provided with flanges projecting peripherally at the top and sides thereof for effecting removable securement of the back wall to top and side flanges such as 32 and 33 in FIG. 1. Thus, when large oven capacity is desired two oven units of the type illustrated in FIGS. 1 and 2 can be placed in end-to-end relationship with their back walls removed, as shown in FIG. 3, to provide a double oven unit with doors at its opposite ends.

Considering the structure of the disclosed oven in greater detail, each oven unit 10 has one or more blower fan motor housings such as 34 and 35 mounted exteriorly of the lower portion of the side wall 14. Within each blower fan housing, a fan motor 36 is mounted, as depicted in FIG. 4, with its drive shaft extending into the oven through an opening 37 in the side wall 14. Top and end walls 38 and 39 of the fan drive motor housings are desirably made of an open-work or mesh material to provide for the flow of cooling air around the fan drive motor and to afford a flow of air from outside of the oven into the oven interior. A fan or blower 40 is mounted on each drive motor shaft interiorly of the oven side wall.

As shown in FIGS. 2 and 4, ducts 42 and 43 are provided on the interior of the oven and extend upwardly from positions close to the bottom of the oven along the interior of the side wall 14 to positions near the top of the oven. Openings 44 and 45 are provided near the lower ends of the ducts 42 and 43 for the flow of air from the interior of the oven, as induced by each blower 40. The openings 44 and 45 in the ducts 42 and 43 are materially larger than the opening 37 in the side wall 14, so that more air is circulated interiorly of the oven than is added from the etxerior of the oven. Electrical heating elements 46 are mounted interiorly of the ducts 42 and 43 for heating the air as it flows upwardly therethrough, as forced by the blower.

At their upper ends, the ducts 42 and 43 communicate with a header space 47. This header space is defined by a foraminous plate 48 which is supported at the top of the interior of the oven by the side walls 13 and 14, and the ducts 42 and 43 is spaced, substantially parallel and opposed relationship to the heat insulated top wall 12. As depicted in FIGS. 5 and 6, the foraminous plate 48 has therein a multiplicity of openings 49, which openings are desirably of uniform size and shape and are arranged in rows extending both laterally and longitudinally of the plate. Furthermore, the spacing between the openings, both laterally and longitudinally is uniform and is somewhat greater than the size of the openings.

With such a plate, serving with the heat insulating top wall 12 to define a header space, it may be readily understood that air forced through the ducts 42 and 43 by the blowers 40 is distributed over the surface of the plate 48 and is disseminated into the interior of the oven in a multiplicity of relatively uniformly distributed jets which are directed straight downwardly through the oven interior. In the oven disclosed, the blowers 40 are of a size, and have air discharge capacities sufficient to maintain a pressure in the header space 47 which is greater than atmospheric pressure, and also greater than the pressure within the interior oven space. Since heating elements 46 are disposed in the ducts 42 and 43 between the blowers 40 and the header space 47, the air injected into the top of the oven through the foraminous plate 48 is heated air, which heated air is forced downwardly through the oven interior to the openings 44 and 45 in the ducts 42 and 43 for recirculation and reheating. The foraminous plate 48, having the openings 49 distributed in relatively uniform relationship over its entire surface, serves to effect a relatively uniform distribution of the heated air over the entire area of one wall of the oven, as well as to direct the flow of heated air into the oven in relatively uniformly distributed jets, so that even though the air has velocity, its turbulence is minimized and its flow is directed.

As shown in FIGS. 3 and 4, stacks 50 communicate with the header space for effecting the exhaust of some of the heated air from the header space to the exterior of the oven. By thus exhausting some air from the interior of the oven, fumes and vapors from the interior of the oven are exhausted as air is circulated within the oven. The exhaust stacks have an airflow capacity materially less than the summation of the areas of the openings 49 in the foraminous plate 48, so that less air is exhausted than is recirculated through the oven. The exhausted air, together with the fumes and vapors disseminated to the exterior of the oven through the stacks 50, is replaced by fresh air from the exterior taken in through the blower drive motor housings 34 and 35 and the openings 37 in the side wall 14.

In order to provide control for the amount of heated air disseminated through the interior oven space, a plurality of foraminous slide plates 52, 53 and 54 are provided, which foraminous slide plates have a multiplicity of openings 55 therein, which openings correspond in size and disposition or distribution to those in the foraminous plate 48. The slide plates 52, 53 and 54 are in face-to-face contact with the upper surface of the foraminous plate 48 and are movable longitudinally to vary the size of the effective openings through the engaged plates by varying the degree of register between the openings in the engaged plates. This degree of register may be varied continuously from fully opened to completely closed.

For guiding the movements of the slide plates, guide strips 56 and 57 are secured, as by welding, to the side margins of the foraminous plate 48 and intervening guide strips 58 and 59 are secured to the foraminous plate 48 to extend between the slide plates 52 and 53 and between the slide plates 53 and 54. The guide strips each have offset flanges thereon which overlie side margins of the slide plates 52, 53 and 54. The guide strips slidably engage the slide plates to maintain lateral registry between the openings in the foraminous plate 48 and the slide plates, while affording freedom of longitudinal movement between the slide plates 52, 53 and 54 and the foraminous plate 48, thereby to effect variation of the effective size of the openings through the plates by varying the registry between the openings of the superposed plates.

For effecting movements of the slide plates 52, 53 and 54 from the exterior of the oven in the disclosed structure, each slide plate has secured to the end thereof adjacent the front or door end of the oven an angle strip 60 which provides an upwardly projecting flange 62 in the header space 47 and in spaced and opposed relationship to a downwardly extending upper front wall portion 63 of the oven. In the form disclosed, a threaded nut 64 is secured, as by welding, to the upper longitudinal mid-region of the flange 62 in alignment with an opening 65 through the flange. A conduit 66 extends through the front wall portion 63 of the oven at a position aligned with the opening 65 and nut 64. A bolt 67 is supported for rotation in the conduit 66 and extends therethrough with a threaded end 68 engaged in the nut 64. Longitudinal movement of the bolt 67 is limited by a head 69 at the exterior of the oven and a washer 70 at the interior of the wall portion 63 of the oven, which washer is retained against longitudinal movement along the bolt by means such as a cotter pin 72. Thus, when the bolt 67 is turned from the exterior of the oven, the slide plate with which that bolt is engaged is moved longitudinally of the oven between its respective guide strips to vary the registry between the openings in the foraminous plates. For observation of treatment of some types of material within the oven, as the effective sizes of the openings are changed, windows 73 and 74 are desirably provided in the doors 16 and 17 respectively.

Latch elements 75 and 76 are secured to the exterior surface of the front wall portion 63 and coacting latch elements 77 and 78 are mounted on the exterior surfaces of the tops of the doors for holding the doors in their closed positions. Also, handles 79 and 80 are provided on the exterior surfaces of the doors to facilitate the opening thereof. The operation of the heating elements 46 and the operation of the blower drive motors 36 are controlled by suitable switches on a control box 82, which box also has thereon a temperature controller of the type which may or may not also indicate the temperature within the oven.

From the foregoing description and by reference to the accompanying drawings, it may be readily understood that I have provided an oven in which the flow of heated air into the oven is dispersed over substantially the full area of one wall of the oven, and also in which that flow of heated air into the oven is directed to minimize turbulence in the airflow through the oven. This oven also provides for the exhaust of vapors and gases as the air is circulated therethrough and for the introduction of air from the exterior to replace that which is exhausted. In addition, the flow of heated air through the oven is continuously variable between maximum and minimum limits, and the adjustment of the flow of heated air through the oven may be regulated from outside of the oven. As another feature, oven units of the type herein disclosed have removable end walls and are adapted to be secured together, so that a plurality of the units operate as a single oven of larger capacity.

I claim:

1. In an oven structure, air flow control means including walls and a first foraminous plate which is a part of a header, means defining a conduit which communicates with said header for supplying air thereto under pressure, a second foraminous plate mounted for linear sliding movement in face-to-face relationship to said first plate, said plates having their openings spaced and disposed for registering alignment affording full opening therethrough in one position and also for effective full closure when off register is effected by movement to a second position and further being continuously variable in effective opening between said positions, said header having an exhaust port in a position opposed to said first foraminous plate, and said exhaust port having an area less than the combined areas of the openings in the first foraminous plate.

2. In an oven structure as defined in claim 1, said conduit having a blower therein which has a capacity sufficient for maintaining air in said header under pressure greater than atmospheric pressure and that within the rest of the oven, whereby air is exhausted from the header both through the openings in said foraminous plates and through said exhaust port.

3. An oven comprising, in combination, a heat insulating enclosure including walls and door means movable relative to the walls for providing access to the interior, one of said walls having a foraminous plate spaced inwardly thereof to define a header space, a duct extending along a wall other than said one and communicating with said header space along one side region thereof, an exhaust port in said one of the walls at a position spaced from said duct and opposed to said foraminous plate and having less air flow capacity than the foraminous plate, said duct also being in communication with openings of different areas at the end region thereof opposite and remote from said header space for the flow of air into the duct from both the interior and exterior of the oven, the larger of said openings carrying air from the interior to said oven so that the flow therefrom is proportionately larger than that from the exterior of the oven, a heating element in said duct, and a blower in said duct for forcing air through the duct from said openings into said header space, said blower having capacity to maintain air in said header space under pressure greater than normal atmospheric pressure.

4. In an oven structure having exterior heat insulating walls, means for effecting relatively even dissemination and for controlling the volume of air flow over a relatively large area, said means comprising a foraminous plate mounted internally of the oven walls in spaced and opposed relationship to one insulating wall to define therebetween a header space, said one insulating wall having an exhaust port therein which has less air flow area than said foraminous plate, means for supplying air under pressure to said header space at a rate for maintaining the pressure in the header space at a value above normal atmospheric pressure, a second foraminous plate mounted for linear sliding movement in face-to-face relationship to the first mentioned plate, the openings in said foraminous plates being similarly spaced and disposed and said plates being mounted for alignment of the openings, and means for shifting the positions of the plates relative to one another to vary the effective sizes of the openings through both plates to control the volume of air flow therethrough.

5. In an oven structure as defined in claim 4, the combination being further characterized by said plates being at the top of the oven and said means for supplying air under pressure to the header space including a duct communicating with the interior of the oven near the bottom thereof through a passage having large air flow capacity and also communicating with the exterior of the oven through a passage having smaller air flow capacity than the latter mentioned passage through which duct air flows from both inside and outside of the oven, and heater elements in said duct between the last mentioned passages and said header space.

References Cited

UNITED STATES PATENTS

| | | | |
|---|---|---|---|
| 1,906,799 | 5/1933 | Lobley. | |
| 2,018,505 | 10/1935 | Suhr | 263—43 X |
| 2,039,429 | 5/1936 | Lydon | 34—225 X |
| 2,089,829 | 8/1937 | Ferree | 263—43 X |
| 2,311,908 | 2/1943 | Vranken | 263—36 X |
| 2,585,666 | 2/1952 | McDowell | 98—415 |
| 2,846,961 | 8/1958 | Nelson | 263—43 X |
| 2,936,692 | 5/1960 | White | 98—41 |
| 3,222,800 | 12/1965 | Siegel et al. | 34—225 X |

FREDERICK L. MATTESON, JR., *Primary Examiner.*

JOHN J. CAMBY, *Examiner.*